United States Patent [19]

Nakae et al.

[11] Patent Number: 5,400,852
[45] Date of Patent: Mar. 28, 1995

[54] OPERATION MODE SETTING APPARATUS FOR AIR CONDITIONER

[75] Inventors: Tsugio Nakae, Oizumi; Manabu Ishihara, Isesaki, both of Japan

[73] Assignee: Sanyo Electric Co., Ltd., Osaka, Japan

[21] Appl. No.: 30,475

[22] PCT Filed: Sep. 10, 1992

[86] PCT No.: PCT/JP92/01155
§ 371 Date: Mar. 25, 1993
§ 102(e) Date: Mar. 25, 1993

[87] PCT Pub. No.: WO93/06420
PCT Pub. Date: Apr. 1, 1993

[30] Foreign Application Priority Data

Sep. 24, 1991 [JP] Japan .................. 3-243584

[51] Int. Cl.[6] .................................... F25B 29/00
[52] U.S. Cl. .................................... 165/12; 165/28; 236/91 D; 236/46 R
[58] Field of Search ............ 165/27, 28, 12; 236/91 D, 91 E, 46 R

[56] References Cited

U.S. PATENT DOCUMENTS

| | | | |
|---|---|---|---|
| 3,212,562 | 10/1965 | Newton | 236/46 R |
| 4,289,272 | 9/1981 | Murase et al. | 165/28 |
| 4,921,163 | 5/1990 | Viessmann | 236/46 R |

FOREIGN PATENT DOCUMENTS

| | | | |
|---|---|---|---|
| 55-148610 | 11/1980 | Japan . | |
| 0086817 | 5/1986 | Japan | 236/46 R |
| 0293037 | 12/1987 | Japan | 236/46 R |
| 63-150550 | 6/1988 | Japan . | |
| 63-306344 | 12/1988 | Japan . | |
| 64-49835 | 2/1989 | Japan . | |
| 2-171537 | 7/1990 | Japan | 165/12 |
| 2-306039 | 12/1990 | Japan | 236/46 R |
| 3-221745 | 9/1991 | Japan . | |

*Primary Examiner*—John K. Ford
*Attorney, Agent, or Firm*—Wenderoth, Lind & Ponack

[57] ABSTRACT

An operation mode of an air condition is automatically set during an intermediate season so that the set operation mode can match the actual sensation of a user. A plurality of temperature zones are set defining a plurality of room-temperature ranges and a respective plurality of outside-temperature ranges, and operation modes are selectively assigned to each of the temperature zones. An operation mode is set according to the zone containing an actual room temperature and outside temperature. In addition, the temperature zones assignments are selectively changed according to a calendar date of operation.

1 Claim, 4 Drawing Sheets

OPERATION MODE SETTING APPARATUS FOR AIR CONDITIONER

BACKGROUND OF THE INVENTION

The present invention relates to the automatic setting of an operation mode of an air conditioner which is capable of a cooling operation, a heating operation and a dehumidifying or drying operation.

In order to realize automatic setting of an operation mode, it has been proposed to automatically set a cooling operation or a heating operation according to whether a room temperature or an outdoor temperature is higher or lower than a set value. However, none of the prior art devices has yet to succeed in realizing optimum settings during an intermediate or transitional period of the four seasons of a year.

An attempt has been made to overcome the problems encountered to the prior art devices described above, as disclosed in Japanese Patent Publication No. 63-150550/1988 (unexamined), in which a plurality of temperature zones A to L are set by using a plurality of room-temperature set values and a plurality of outdoor-temperature set values freely and, for example, temperature zone A is assigned to a zone for setting a heating operation, temperatures K, G and H are assigned to a zone for setting a dehumidifying (or drying) operation, a temperature zone L is assigned to a zone for setting a cooling operation, and the other zones are assigned to a supervising zone which is a zone for detecting a room temperature at predetermined time intervals. In this prior art, any one of these temperature zones is determined to be the most suitable one according to a room temperature and an outdoor temperature, and a desired operation mode is automatically selected on the basis of this result of the determination.

Japanese Patent Publication No. 63-306344/1988 (unexamined) shows a device for determining any one of the four seasons by using room temperature and date information. The determination of a season is normally made on the basis of the date information, and during a transitional period (that is, a period having unstable conditions corresponding to a plurality of seasons in which temperature conditions are not stable), the determination of a season is made by measuring the maximum and minimum temperatures of the day.

However, in any of the prior art devices described above, it is difficult to achieve accurate selection during an intermediate period, such as spring and autumn, if automatic selection is executed from among the cooling operation, heating operation and dehumidifying operation.

When a plurality of temperature zones are set and automatic selection of an operation is executed, a problem arises in that the temperature sensation (or feeling) of a user varies depending on spring or autumn even within the same temperature zone. More specifically, users generally feel cold in spring and desire heating, but in autumn, feel hot and desire cooling, even when the same temperature zone is selected in spring and autumn. It is, therefore, quite difficult to realize an optimum automatic selection merely by the setting of temperature zones.

Another problem arises in that if a determination of a season is made, the result of the determination does not always correspond to a desired operation mode and, particularly in summer, it is difficult to determine an accurate timing at which switching from the dehumidifying operation is to be executed to the cooling operation.

SUMMARY OF THE INVENTION

An object of the present invention is to provide a new operation-mode setting apparatus for setting an optimum temperature zone during the intermediate period of seasons such as spring and autumn.

According to the present invention, there is provided an operation-mode setting apparatus for an air conditioner, which automatically sets one of operation modes including a cooling mode, a heating mode and a dehumidifying mode. The operation-mode setting apparatus has a zone setting part for determining a plurality of temperature zones from a plurality of room temperature set values and a plurality of outdoor temperature set values, a first zone assignment part for assigning each zone to a zone for setting a cooling mode, a zone for setting a heating mode, a zone for setting a dehumidifying mode and another zone, and a second zone assignment part for assigning, on the basis of a date information, the aforesaid other zone to a zone for setting any one of a cooling mode, a heating mode and a dehumidifying mode, whereby a desired operation mode is automatically set by detecting the room temperature and the outdoor temperature.

There is also provided an operation-mode setting apparatus for executing automatic selection from among operation setting of an air conditioner for carrying out a cooling operation, a heating operation and a dehumidifying operation. This apparatus has a zone setting part for setting a plurality of temperture zones from a plurality of room-temperature set values and a plurality of outdoor-temperature set values, a first zone assignment part for assigning each zone to a zone for setting a cooling operation, a zone for setting a heating operation and another zone, and a second zone assignment part for dividing the aforesaid other zone into a plurality of zones on the basis of outdoor temperatures, and assigning, on the basis of a date information, each of divided plurality of the zones to a zone for setting any one of a cooling operation, a heating operation and a dehumidifying operation, whereby a desired operation mode is automatically set by detecting the room temperature and the outdoor temperature.

The operation-mode setting apparatus in the present invention as described above changes operation modes of part of the temperature zones on the basis of the date of a calendar.

PREFERRED EMBODIMENTS OF THE INVENTION

Figure 1:
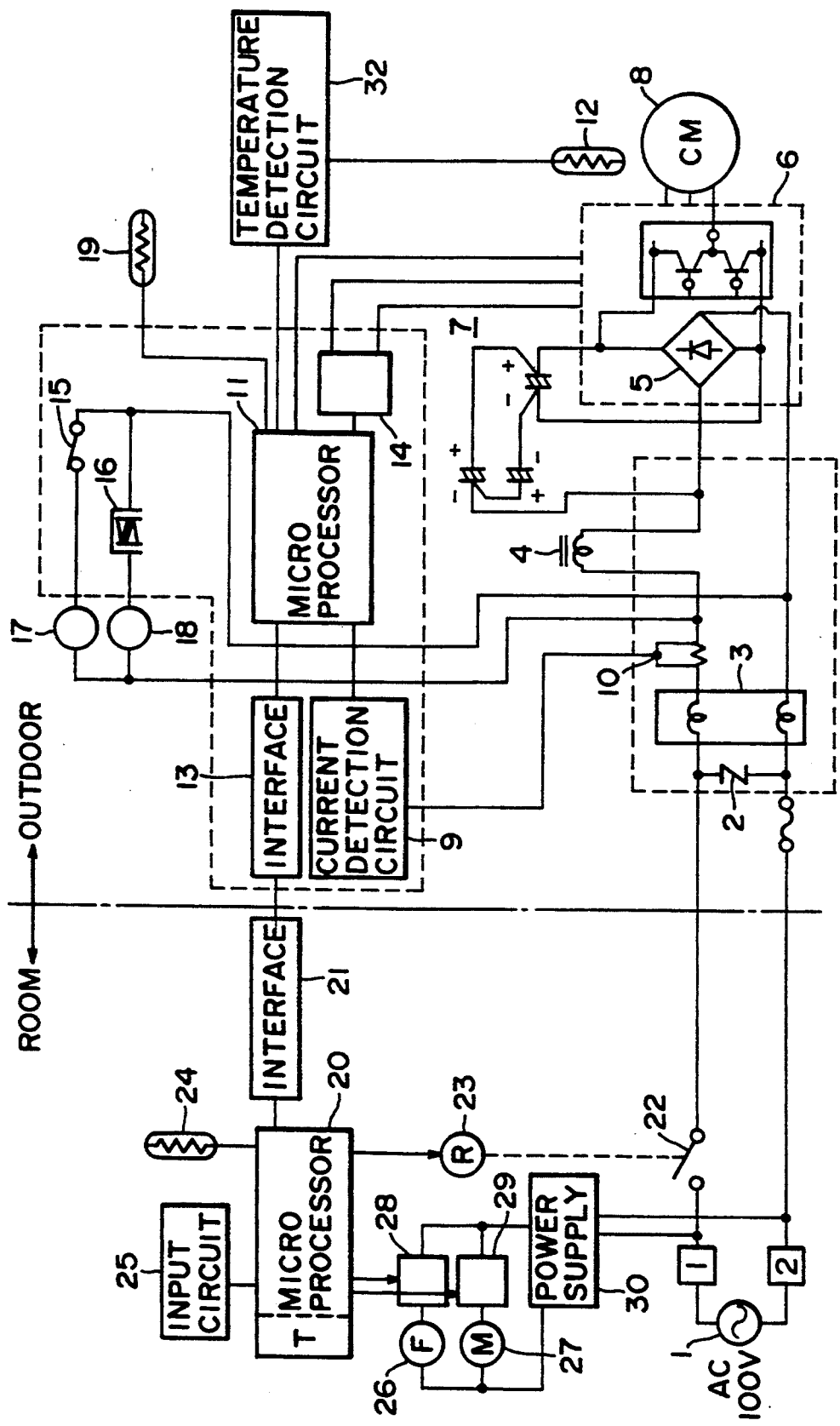
FIG. 1 is a diagram of an electric circuit of an air conditioner embodying the present invention.

Referring first to FIG. 1, a 100-V commercial AC power source 1 supplies AC power to a room unit and an outdoor unit. A varistor 2 serves to absorb a surge voltage. A coil 3 and a choke coil 4 constitute a noise filter in combination with the varistor 2. A diode bridge 5 serves to perform full-wave rectification of a single-phase commercial alternating current and output the resultant current to an inverter bridge 6. During this full-wave rectification, an AC voltage having an effective value of 100 V is converted into a DC voltage of approximately 280 V by a voltage doubler rectifier circuit 7, and the DC voltage of approximately 280 V is supplied to the inverter bridge 6. This inverter bridge 6 is made up of six switching elements which are connected in three-phase bridge form, and each of the switching elements is switched on/off on the basis of a PWM theory to output a three-phase pseudo-sine wave to a compressor 8.

A direct current detection circuit 9 converts an alternating current detected by a DC transformer (CT) 10 into a direct current and applies the direct current to an A/D (analog/digital) input port of a microprocessor 11. The microprocessor 11 corrects the frequency of the pseudo-sine wave to be supplied to the compressor 8 so that the current detected by the current detection circuit 9 does not exceed a predetermined current.

A temperature sensor 12 detects a temperature of the compressor 8. The microprocessor 11 receives a sensor output indicative of this temperature via a temperature detection circuit 32 and, as in the case of the current detection described above, corrects the frequency of the pseudo-sine wave to be supplied to the compressor 8 so that the temperature does not exceed a predetermined temperature.

An interface 13 serves to establish communication of data between the microprocessor 11 of the outdoor unit and a microprocessor 20 of the room unit. The room unit transmits signals such as an operation signal indicative of a cooling operation, a heating operation or a dehumidifying operation and a signal which serves to determine the frequency of the three-phase pseudo-sine wave to be supplied to the compressor 8. The interface 13 also serves to transmit, to the outdoor unit, data such as data indicative of a temperature detected by an outdoor-temperature sensor 19 and data indicative of the occurrence of an abnormality.

A signal amplifying circuit 14 electrically amplifies an on/off signal outputted from the microprocessor 11 up to a magnitude which permits driving of the switching elements of the inverter bridge 6. A switching signal based on the PWM theory is generated by the microprocessor 11 on the basis of a frequency signal.

A relay 15 and a phototriac 16 are controlled by the microprocessor 11. Reference numeral 17 denotes a four-way valve and reference numeral 18 a fan for an outdoor heat exchanger. A refrigerant cycle for the cooling operation and a refrigerant cycle for the heating operation are switched by switching the four-way valve 17. The rotating speed of the fan 18 is varied with a variation in outdoor temperature by varying the firing angle of the phototriac.

A microprocessor 20 provides control over the outdoor unit. The microprocessor 20 transfers data to/from the microprocessor 11 via the interface 21. A normally open contact 22 is opened or closed under control of a relay 23. When an air-conditioning operation is to be performed, the microprocessor 20 energizes the relay 23 to close the contact 22, thereby supplying electric power to the outdoor unit. When the contact 22 is open, the interface 21 simultaneously shuts off signal transfer so that no signal is transmitted to the outdoor unit.

A room-temperature sensor 24 detects the temperature of a room to be air-conditioned. The microprocessor 20 obtains a value indicative of the increased or decreased amount of the frequency of the pseudo-sine wave to be supplied to the compressor 8, from a desired temperature and the temperature detected by the room-temperature sensor 24, and then transmits a corresponding new frequency signal to the outdoor unit. A method of obtaining the value indicative of the increased or decreased amount of frequency is selected from among PID control, fuzzy control and the like.

An input circuit 25 permits setting of operation data. During the use of a wireless remote controller or the like, the operation data is transmitted from the wireless remote controller as a wireless signal and received by the input circuit 25.

A fan motor 26 is provided for air supplying, and a motor 27 is for driving a flap (not shown) which serves to change the direction of air stream. The fan motor 26 and the motor 27 are controlled by motor controllers 28 and 29, respectively. A power supply circuit 30 supplies DC power to the room unit.

The microprocessor 20 controls the rotating speed of the fan motor 26 and the rotating angle of the flap driving motor 27. A clock and a calendar are incorporated into the microprocessor 20 as an internal program. Each time the clock counts one day, the date is set forward by one day. If the power supply is turned on and an initial value is set, the microprocessor can function as a clock and a calendar.

Figure 2:
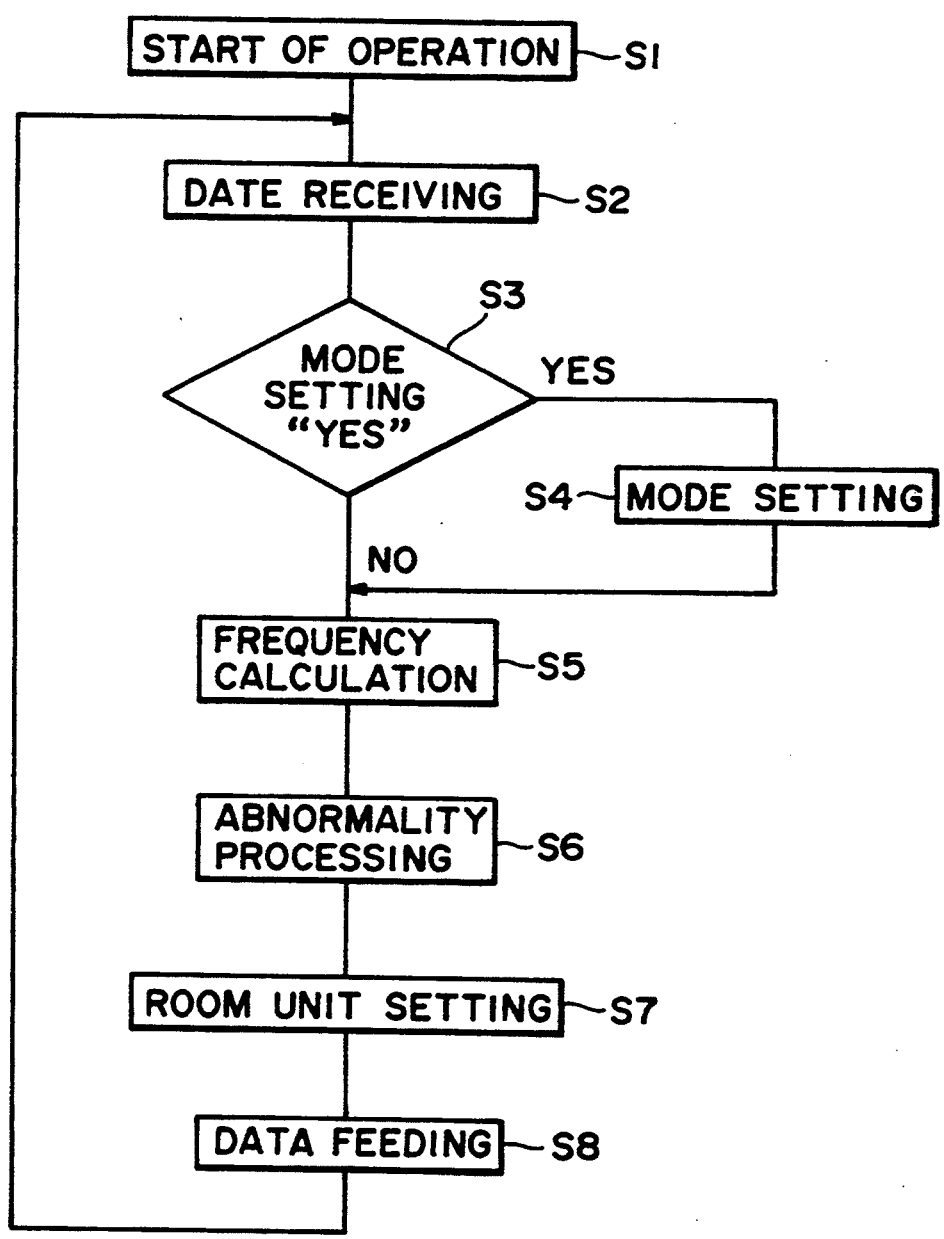
FIG. 2 is a diagram showing essential operational steps of the air conditioner shown in FIG. 1.

In FIG. 2 showing the essential operational steps of the air conditioner arranged in the above-described manner, the operation of the air conditioner is started in Step S1. In Step S2, various data are received, such as outdoor temperature data from the outdoor unit, frequency data for driving the compressor 8, defrosting data, and abnormality data indicative of the kind and nature of abnormality if it occurs in the outdoor unit. Furthermore, during the use of the wireless remote controller, if a wireless signal transmitted from the wireless remote controller is received, the received wireless signal is inputted into the microprocessor 20.

In Step S3, it is determined whether setting (or changing) of an operation mode is needed. If it is determined that setting of the operation mode is needed, the operation mode is set in Step S4. Typical examples of the case where it is determined that setting of the operation mode is needed are: when the operation of the air conditioner is initially started with the automatic selection of the operation mode being set by a switch or the like; when the operation of the air conditioner is started after the air conditioner is continuously placed in its inoperative state for two hours or more (i.e., when changing of the operation mode must be performed); and when the mode setting of the air conditioner changes from a manual operation mode to an automatic operation mode if the air conditioner is operated under remote control (HA input).

In Step S5, a frequency value to be transmitted to the outdoor unit is calculated from a room temperature and a desired temperature. In Step S6, If it is determined that any abnormality has occurred in the air conditioner, a required processing is executed. In Step S7, setting of the room unit is performed, that is, the rotating speed of the fan motor 26 and the rotating angle of the flap-driving motor 27 are determined.

In Step S8, data are transmitted to the outdoor unit, such as operation mode data for controlling the on/off operation of the four-way valve 17 (i.e., data indicative of any of the cooling operation, the heating operating and the dehumidifying operation), and frequency data for a pseudo-sine wave to be supplied to the compressor 8.

Figure 3:
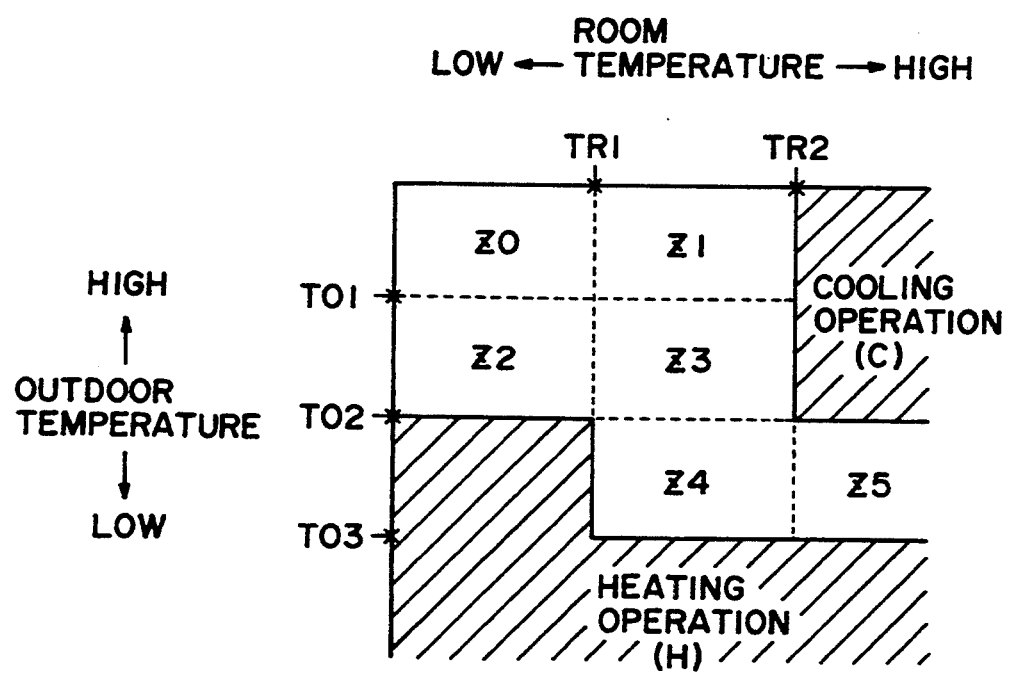
FIG. 3 is an explanatory diagram showing temperature zones based on room temperatures and outdoor temperatures.

In FIG. 3 which shows temperature zones used in determining the operation mode in Step S4, a plurality of room-temperature set values TR1 and TR2 and a plurality of outdoor-temperature set values are used to set a plurality of temperature zones. The temperature zones are set in a virtual space of a computer program in accordance with a zone setting program (a zone setting part) of the microprocessor 20. The temperature zones are determined as a zone C (a zone for setting a cooling operation), a zone H (a zone for setting a heating operation) and zones Z0 to Z5 (other zones) in the virtual space in accordance with a zone assignment program (a first zone assignment part). The zones Z0 to Z5 are reassigned to any one of the zones including a zone for setting the cooling operation, a zone for setting the heating operation, and a zone for setting an operation which provides a dehumidifying effect (such as dehumidifying operation utilizing a reheating device or a drying operation utilizing a reheating device or a drying operation which carries out simple dehumidification by intermittently driving an indoor fan) in accordance with a zone assignment program (a second zone assignment part) which runs on the basis of a date (data indicative of a month and a day cumulatively calculated by and stored in the microprocessor 20). For example, (1) if the date stored in the microprocessor 20 falls in the months from May to October, the zones Z0 to Z5 are selected as zones for setting the drying operation; and (2) if the date stored in the microprocessor 20 falls in the months from November to April, the zones Z0 and Z1 are selected as zones for setting the drying operation, while the zones Z2 through Z5 are selected as zones for setting the heating operation.

By dividing one year into two periods in the above-described manner, it is possible to set temperature zones which permit drying operation or the cooling operation to be primarily selected during the relatively hot period between May and October, as well as temperatutre zones which permit the heating operation to be primarily selected during the relatively cold period between November and April. Accordingly, it is possible to set an operation mode which matches the actual sensation or feeling of a user.

Figure 4:
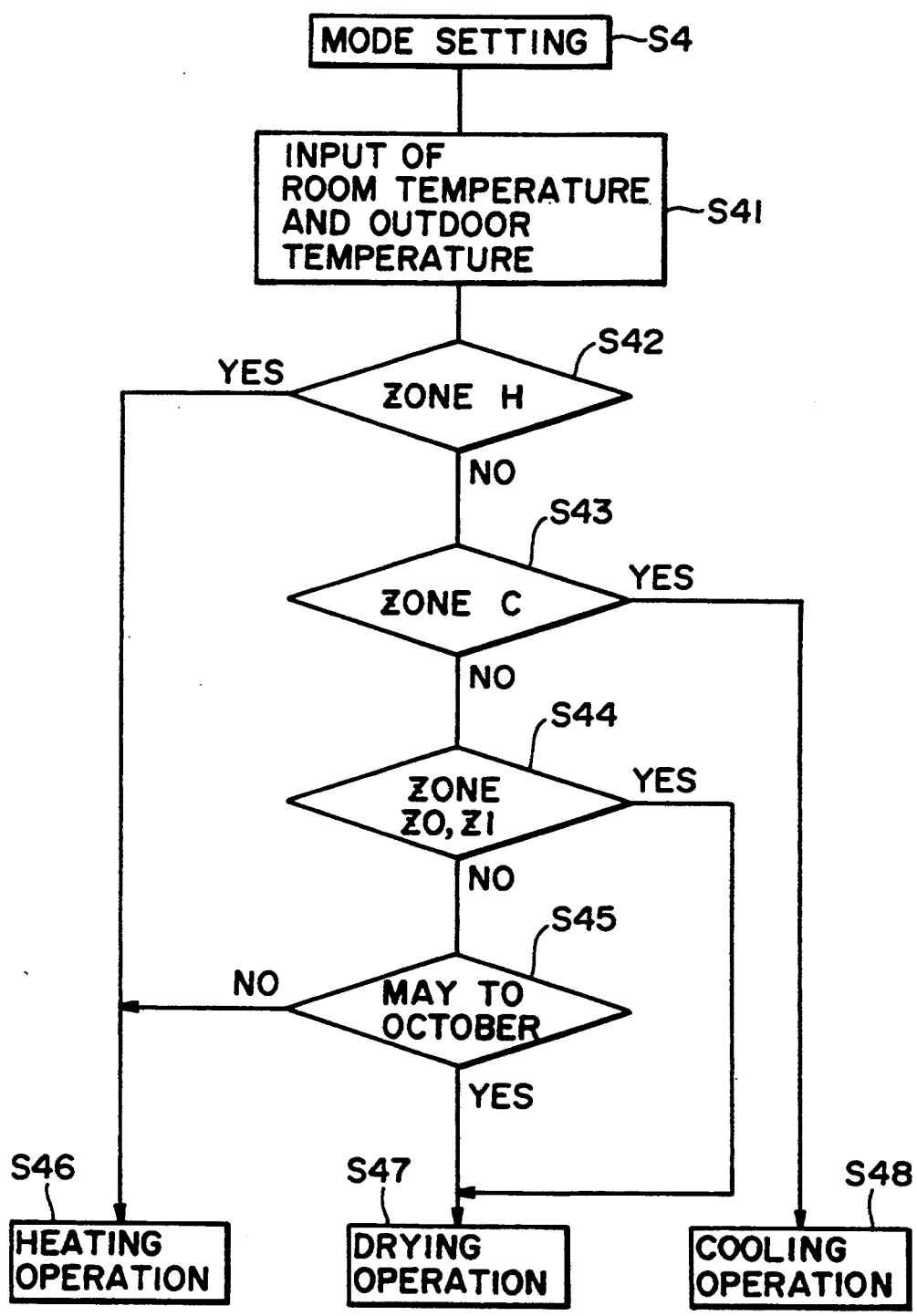
FIG. 4 is a diagram showing an operation for setting an operation mode.

FIG. 4 is a diagram showing an operation which executed to set an operation mode by using the temperature zones shown in FIG. 3. In Step S41, a room temperature and an outdoor temperature are inputted. The room temperature is a temperature detected by the room-temperature sensor 24, and the outdoor temperature is a temperature detected by the outdoor-temperature sensor 19 of the outdoor unit. The outdoor temperature is transmitted as data from the microprocessor 11 to the microprocessor 20. In Steps S42 to S44, it is determined which temperature zone corresponds to the room temperature and the outdoor temperature. If it is determined that the zone C corresponds to the room temperature and the outdoor temperature, the process proceeds to Step S48, where the cooling operation is set. If it is determined that the zone H corresponds to both the room and outdoor temperatures, the process proceeds to Step S46, where the heating operation is set. If it is determined that the zone Z0 or Z1 corresponds to both temperatures, the process proceeds to Step S47, where the drying operation is set. If any of the remaining zones corresponds to both temperatures, the process proceeds to Step S45, where it is determined whether the current date is between May and October. If the current date is between May and October, the process proceeds to Step S47, where the drying operation is set. If the current date is between November and April, the process proceeds to Step S46, where the heating operation is set.

The manner of assignment of the zones Z0 to Z5 and the manner of date setting are not limited to the examples explained above. For example, one year may be divided into six periods or seasons such as winter, spring, a rainy season, summer, autumn and early winter, and the assignment of the zones Z0 to Z5 may be altered for each season so that it is possible to obtain temperature zones optimum for each individual season.

Although in the present embodiment the date used for setting an operation mode is calculated by and stored in the microprocessor 20 of the room unit, date information may be calculated by and stored in the wireless remote controller so that the date information is transmitted to the room unit. The date information may also be visually displayed on the wireless remote controller.

As described above, in the operation-mode setting device of an air conditioner according to the present invention, a plurality of temperature zones are set by using a plurality of room temperature set values and a plurality of outdoor temperature set values. By determining which temperature zone coressponds to the actual room temperature and outdoor temperature, a cooling operation, a heating operation and a dehumidifying operation are selectively set according. In addition, the temperature zones are arranged so that the operation modes are changed according to the calendar date. Accordingly, the manner of selective setting of the operation modes which is based on the temperature zones can be modified in accordance with a date so that the cooling operation or the heating operation can be preferentially selected. It is, therefore, possible to automatically change temperature zones in accordance with the actual sensation of a user so that the heating operation and the cooling operation can be preferentially selected in spring and in autumn, respectively. Accordingly, it is possible to provide an arrangement capable of setting an optimum operation mode throughout the year.

What is claimed is:

1. An operation mode setting apparatus for an air conditioner, said apparatus for setting any one of plural operation modes of the air conditioner, said operation modes including a room cooling mode for cooling a room, a room heating mode for heating said room and a room dehumidifying mode for dehumidifying said room, said apparatus comprising:
   room temperature detection means for detecting a temperature of said room;
   outdoor temperature detection means for detecting an outdoor temperature;
   date information generating means for generating date information indicative of a calendar date upon initiation of a starting operation of said air conditioner;
   zone setting means for determining a plurality of temperature zones, each of said plurality of temperature zones being defined by a room temperature range and an associated outdoor temperature range;

zone marking means for marking at least one of said plurality of temperature zones as a cooling mode zone, for marking at least one other of said plurality of temperature zones as a heating mode zone, and for marking at least a remaining one of said plurality of temperature zones as a dehumidifying mode zone;

changing means for changing the marking of at least one of said plurality of zones from said dehumidifying mode zone to one of said cooling mode zone and said heating mode zone in accordance with said date information; and operation mode setting means for automatically setting the operation mode of the air conditioner in accordance with the marking of a temperature zone containing the room temperature detected by said room temperature detecting means and the outdoor temperature detected by said outdoor temperature detecting means.

* * * * *